United States Patent
Arai et al.

(10) Patent No.: US 10,480,043 B2
(45) Date of Patent: Nov. 19, 2019

(54) SEAMLESS STEEL PIPE FOR LINE PIPE AND METHOD FOR PRODUCING THE SAME

(71) Applicant: NIPPON STEEL & SUMITOMO METAL CORPORATION, Tokyo (JP)

(72) Inventors: Yuji Arai, Tokyo (JP); Yukimasa Ueda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 220 days.

(21) Appl. No.: 15/308,848

(22) PCT Filed: May 12, 2015

(86) PCT No.: PCT/JP2015/063673
§ 371 (c)(1),
(2) Date: Nov. 4, 2016

(87) PCT Pub. No.: WO2015/174424
PCT Pub. Date: Nov. 19, 2015

(65) Prior Publication Data
US 2017/0067129 A1 Mar. 9, 2017

(30) Foreign Application Priority Data
May 16, 2014 (JP) ................. 2014-102136

(51) Int. Cl.
C21D 8/10 (2006.01)
C21D 9/08 (2006.01)
C22C 38/58 (2006.01)
C22C 38/00 (2006.01)
C22C 38/02 (2006.01)
C22C 38/04 (2006.01)
C22C 38/06 (2006.01)
C22C 38/22 (2006.01)
C22C 38/24 (2006.01)
C22C 38/28 (2006.01)
C22C 38/32 (2006.01)
C22C 38/38 (2006.01)
C22C 38/42 (2006.01)
C22C 38/44 (2006.01)
C22C 38/46 (2006.01)
C22C 38/48 (2006.01)
C22C 38/50 (2006.01)
C22C 38/54 (2006.01)
F16L 9/02 (2006.01)

(52) U.S. Cl.
CPC .............. *C21D 9/085* (2013.01); *C21D 8/10* (2013.01); *C21D 8/105* (2013.01); *C21D 9/08* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/28* (2013.01); *C22C 38/32* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *F16L 9/02* (2013.01)

(58) Field of Classification Search
CPC . C21D 8/10; C21D 8/105; C21D 9/08; C21D 9/105; F16L 9/02
USPC ........................................... 148/590
See application file for complete search history.

(56) References Cited

U.S. PATENT DOCUMENTS

| | | | |
|---|---|---|---|
| 4,075,041 A | 2/1978 | Ueno et al. | |
| 2008/0236710 A1* | 10/2008 | Rakowski | C21D 1/74 148/606 |
| 2008/0257459 A1* | 10/2008 | Arai | C21D 8/10 148/593 |

FOREIGN PATENT DOCUMENTS

| | | |
|---|---|---|
| CN | 1871369 | 11/2006 |
| CN | 100420758 | 9/2008 |
| CN | 101287852 | 10/2008 |
| CN | 101287853 | 10/2008 |
| CN | 102 703 831 | 10/2012 |
| EP | 1 876 254 | 1/2008 |
| EP | 1 918 395 | 5/2008 |
| EP | 3 031 943 | 6/2016 |

(Continued)

OTHER PUBLICATIONS

Autorenkollektiv: "Spurenelemente im Stahl...im Smelzbatrieb", Spurenelemente in Staehlen, Verlag Stahlelsen, Duesseldorf, DE, Jan. 1, 1985, pp. 19-22, Extended European Search Report as a concise explanation.

Primary Examiner — Jie Yang
(74) Attorney, Agent, or Firm — Clark & Brody

(57) ABSTRACT

A seamless steel pipe for line pipe has a chemical composition consisting, by mass percent, of C: 0.03-0.15%, Si: ≤0.50%, Mn: 1.0-2.0%, P: ≤0.050%, S: ≤0.005%, Cr: 0.1-1.0%, Al: 0.001-0.10%, N: ≤0.01%, Ni: 0.05-2.0%, B: 0.0003-0.0015%, Ca: 0.0002-0.0050%, Mo: 0.10-0.50%, Ti: 0.001-0.05%, Cu: 0-2.0%, Nb: 0-0.05%, V: 0-0.10%, the balance: Fe and impurities, and satisfying the conditions of 2Nb+4V+Mo≤0.50, wherein a metal micro-structure of the steel pipe contains 50% or more of bainite, in an area fraction, a wall thickness of the steel pipe is 25 mm or larger, and in a scale formed on the surface of the steel pipe, metal particles consisting mainly of Ni or Cu having an average circle-equivalent diameter of 0.1-5 mm exist. A distance from a boundary between the base metal of the steel pipe and the scale to a region in which the metal particles do not exist is 20 mm or longer.

8 Claims, No Drawings

(56) References Cited

FOREIGN PATENT DOCUMENTS

| | | |
|---|---|---|
| JP | 10-060538 | 3/1998 |
| JP | 10-291008 | 11/1998 |
| JP | 2004-176172 | 6/2004 |
| WO | 01/057286 | 8/2001 |
| WO | 2007/023804 | 3/2007 |
| WO | 2007/023805 | 3/2007 |
| WO | 2015/019708 | 2/2015 |

\* cited by examiner

SEAMLESS STEEL PIPE FOR LINE PIPE AND METHOD FOR PRODUCING THE SAME

TECHNICAL FIELD

The present invention relates to a seamless steel pipe for line pipe and a method for producing the same and, more particularly, to a high-strength and high-toughness seamless steel pipe for line pipe having a low surface hardness and a method for producing the same.

BACKGROUND ART

In recent years, the mining conditions of oil wells and gas wells (hereinafter, oil and gas wells are collectively referred to simply as "oil wells") of crude oil, natural gas, and the like have become severer. Concerning the mining environments, as the mining depth increases, the atmosphere contains $CO_2$, $H_2S$, $Cl^-$, and the like, and the mined crude oil and natural gas also contain large amounts of $H_2S$. Therefore, the requirement on performance of a line pipe for transmitting the crude oil and natural gas has also become more rigid, and a demand for steel pipes for line pipe having sulfide resistance has increased.

The standards of National Association of Corrosion Engineers (NACE) specify the highest hardness of steel for steels used in $H_2S$ environments from the viewpoint of sulfide stress cracking resistance (hereinafter, referred also to as "SSC resistance"), which is 250 HV10 or lower for carbon steels. Therefore, for steels that are required to have sulfide resistance, the improvement in technique for restraining hardness has become an important problem. The "HV10" means a "hardness symbol" in the case where Vickers hardness test is conducted with the test force being 98.07 N (10 kgf).

In the case where a high-strength seamless steel pipe for line pipe is produced, unlike the production process of UO steel pipes in which controlled rolling is performed, it is a common practice to perform quenching followed by tempering, in order to assure strength. For a low-carbon steel such as a steel for line pipe, by the ordinary quenching and tempering treatment, martensite is not formed, and a microstructure consists mainly of bainite. Because of great dependence on cooling rate, the micro-structure sometimes differs between the surface and the interior of steel pipe. Therefore, as compared with the interior in which the cooling rate is low, the surface, on which the cooling rate is high, tends to have a high hardness. As the result, the highest hardness on the surface becomes high with respect to the strength of steel. This tendency becomes remarkable as the strength increases and the wall thickness increases because of the increase in amount of added alloying elements.

Patent Document 1 discloses a seamless steel pipe for line pipe and method for producing the same having a high strength of X80 grade (a yield strength of at least 551 MPa) and having improved toughness and corrosion resistance just by heat treatment in the form of quenching and tempering, in the case of a thick-walled seamless steel pipe having a thickness of at least 30 mm. Also, Patent Document 2 discloses high-strength, high-toughness seamless steel pipe for line pipe having a strength of X80 grade.

LIST OF PRIOR ART DOCUMENTS

Patent Document

Patent Document 1: WO2007/023804
Patent Document 2: WO01/057286

DISCLOSURE OF THE INVENTION

Problems to be Solved by the Invention

Although a seamless steel pipe for line pipe disclosed in Patent Document 1 has high strength and improved corrosion resistance, the surface hardness is not considered, so that there remains room for improvement. Also in Patent Document 2, no study has been made to suppress a rise of surface hardness.

The present invention has been made to solve the above-described problems, and accordingly an objective thereof is to provide a high-strength and high-toughness seamless steel pipe for line pipe, in which the surface hardness is kept low, and a method for producing the seamless steel pipe.

Means for Solving the Problems

The present inventors earnestly studied a method for increasing the strength and toughness and for keeping the surface hardness low, and resultantly came to obtain the following findings.

Steel pipes were subjected to quenching and tempering treatment, and surface hardness was measured at various places. Resultantly, it was found that the measured values varied greatly. If the heat treatment conditions are fixed, the surface hardness of steel pipe is determined by the chemical composition and the cooling rate. The chemical composition on the steel pipe surface was analyzed, and resultantly the segregation of components was not recognized. Therefore, it is thought that the variations in surface hardness are attributable to the variations in local cooling rate.

Accordingly, the cause for variations in cooling rate on the steel pipe surface was further studied. The surface properties of steel pipe were observed in detail, and it was found that the hardness is high in a location where the scale on the steel pipe surface is detached, and the hardness is low in a location where the scale adheres firmly to the surface. That is to say, the variations in cooling rate depend on whether the scale adheres tightly to the surface or peels off. Therefore, it is thought that if the scale on the steel pipe surface can be made adhere to the surface uniformly, the variations in hardness are suppressed, and therefore the highest hardness can be restrained.

The present inventors studied the method for improving the adhesion of scale, and found out that by containing a predetermined amount of Ni or further Cu in the base metal of steel pipe, metal particles consisting mainly of Ni or Cu are dispersed finely in the scale, and thereby the adhesion of scale can be improved.

The relationship between the adhesion of scale and the dispersing state of metal particles was further examined. As the result, it was found that in order to improve the adhesion of scale, a simple dispersion of metal particles consisting mainly of Ni or Cu in scale is not enough, and it is important to grow the scale sufficiently, and to make the metal particles consisting mainly of Ni or Cu exist in a wide range from the boundary between base metal and scale toward the scale side.

Generally, if the thickness of scale increases, the scale adhesion deteriorates. However, the scale in which metal particles consisting mainly of Ni or Cu are dispersed exerted good adhesion even if the scale was thick. Also, a thick scale reduces the cooling rate of the steel pipe surface portion due to the thermal insulation effect, so that the increase in surface hardness can be suppressed.

With the decrease in cooling rate in the near-surface portion, the cooling rate in the central portion of wall thickness further decreases. This phenomenon establishes a condition that the strength is less liable to increase. However, by containing Ni or further Cu in the steel, the hardenability is guaranteed, so that high strength and toughness can be maintained.

Furthermore, since the as-quenched hardness depends on the carbon content, by keeping the C content low, the hardness can be decreased. Also, in order to restrain the surface hardness, it is necessary to properly control the contents of Mo, V and Nb that cause secondary hardening during tempering.

On the other hand, limiting the elements that cause secondary hardening during tempering inevitably reduce the strength of the steel. The present inventors therefore studied effects of alloy elements on the strength and toughness closely, based on the steel that is reduced in contents of Mo, V and Nb.

In the result, it was discovered that increases of contents of Mn and Cr that enhance hardenability deteriorates toughness as wall thickness increases. In contrast, it was discovered that addition of B that enhance hardenability likewise does not deteriorate toughness largely despite the increase of strength. Generally, hardness of a steel pipe surface tends to increase as strength of central portion of wall thickness rises. In the case where B is contained, however, the surface hardness does not increase remarkably despite the rise of strength of central portion of wall thickness by enhancing hardenability. It seems that this is because tempering softening resistance of B is low as compared with those of Mn and Cr.

The present invention has been accomplished on the basis of the above-described findings, and involves the seamless steel pipe for line pipe and the method for producing the same that are described below.

(1) A seamless steel pipe for line pipe having a chemical composition consisting, by mass percent, of
C: 0.03 to 0.15%,
Si: 0.50% or less,
Mn: 1.0 to 2.0%,
P: 0.050% or less,
S: 0.005% or less,
Cr: 0.1 to 1.0%,
Al: 0.001 to 0.10%,
N: 0.01% or less,
Ni: 0.05 to 2.0%,
B: 0.0003 to 0.0015%,
Ca: 0.0002 to 0.0050%,
Mo: 0.10 to 0.50%,
Ti: 0.001 to 0.05%,
Cu: 0 to 2.0%,
Nb: 0 to 0.05%,
V: 0 to 0.10%,
the balance: Fe and impurities, and
satisfying the following formula (i),
wherein a metal micro-structure of the steel pipe contains 50% or more of bainite, in an area fraction;
a wall thickness of the steel pipe is 25 mm or larger; and in a scale formed on the surface of the steel pipe, metal particles consisting mainly of Ni or Cu having an average circle-equivalent diameter of 0.1 to 5 μm exist, and a distance from a boundary between the base metal of the steel pipe and the scale to a region in which the metal particles do not exist is 20 μm or longer:

$$2Nb+4V+Mo \leq 0.50 \tag{i}$$

where each symbol of element in formula (i) represents the content (mass %) of each element.

(2) The seamless steel pipe for line pipe according to (1), wherein
the chemical composition contains, by mass percent, one or more elements selected from
Cu: 0.01 to 2.0%,
Nb: 0.01 to 0.05%, and
V: 0.01 to 0.10%.

(3) The seamless steel pipe for line pipe according to (1) or (2), wherein at a position 10 μm distant from the boundary to the scale side, the number density of the metal particles observed per unit area is $5 \times 10^3$ pieces/mm$^2$ or higher.

(4) A method for producing the seamless steel pipe for line pipe, wherein the steel pipe having the chemical composition consisting, by mass percent, of
C: 0.03 to 0.15%,
Si: 0.50% or less,
Mn: 1.0 to 2.0%,
P: 0.050% or less,
S: 0.005% or less,
Cr: 0.1 to 1.00/%,
Al: 0.001 to 0.10%,
N: 0.01% or less,
Ni: 0.05 to 2.0/%,
B: 0.0003 to 0.0015%,
Ca: 0.0002 to 0.0050/o,
Mo: 0.10 to 0.50%,
Ti: 0.001 to 0.05%,
Cu: 0 to 2.0%,
Nb: 0 to 0.05%,
V: 0 to 0.10%,
the balance: Fe and impurities, and
satisfying the following formula (i),
is conveyed into a furnace after the finish of hot rolling, being heated in an atmosphere with the temperature of $Ac_3+50°$ C. or higher and the water vapor concentration of 5% or higher, and thereafter is subjected to quenching treatment in which accelerated cooling is performed at a rate of 10° C./s or higher, subsequently being tempered at a temperature of $Ac_1-50°$ C. or lower:

$$2Nb+4V+Mo \leq 0.50 \tag{i}$$

where each symbol of element in formula (i) represents the content (mass %) of each element.

(5) The method for producing the seamless steel pipe for line pipe according to (4), wherein
the chemical composition contains, by mass percent, one or more elements selected from
Cu: 0.01 to 2.0%,
Nb: 0.01 to 0.05%, and
V: 0.01 to 0.10%.

Advantageous Effects of the Invention

According to the present invention, the steel pipe has a yield strength of 550 MPa or higher and a toughness at the fracture transition temperature (vTrs) of −80° C. or lower, and also the highest hardness on the surface of steel pipe can be restrained to 250 HV10 or lower, so that a high-strength and high-toughness seamless steel pipe excellent in SSC resistance can be obtained. Therefore, the seamless steel pipe according to the present invention can be used suitably as a line pipe for transmitting crude oil and natural gas containing large amounts of $H_2S$.

MODE FOR CARRYING OUT THE INVENTION

Components of the present invention is described below in detail.

1. Scale

The seamless steel pipe for line pipe according to the present invention have metal particles consisting mainly of Ni or Cu with an average circle-equivalent diameter of 0.1 to 5 µm in the scale formed on the surface of steel pipe. In the present invention, the "metal particles consisting mainly of Ni or Cu" include the "metal particles consisting mainly of Ni and Cu". And the metal particle can contain elements such as Fe in addition to Ni or Cu.

Even if tempering is performed after quenching, the properties of scale and the dispersion state of metal particles are scarcely changed. The reason for this is as described below. Since the steel pipe is allowed to cool after being tempered, the scale does not peel off. Also, since the tempering temperature is lower than the quenching temperature, the diffusion rate of Ni and Cu is low, and the growth or movement of metal particles is less liable to occur.

Although the metal particles consisting mainly of Ni or Cu are dispersed near the boundary between base metal and scale, the metal particles do not exist in the whole of scale, and near the scale surface which is distant from the boundary, a region is present where the metal particles do not exist.

Even if the metal particles exist in the scale, if the distance from the boundary between base metal and scale to the region in which the metal particles do not exist is shorter than 20 µm, the adhesion of scale is insufficient. Therefore, in order to improve the adhesion of scale and to suppress the highest hardness, the metal particles have to be dispersed widely in the scale, and it is necessary that the distance from the boundary between base metal and scale of the steel pipe to the region in which the metal particles do not exist be 20 µm or longer.

As the "distance from the boundary between base metal and scale to the region in which the metal particles do not exist", in the region in which the backscattered electron image (200 µm×200 µm) was obtained, throughout the overall length of boundary, the distance from the boundary to the region in which the metal particles do not exist is measured, and the maximum value of the distance is used.

Also, even if the metal particles are distributed in a wide range in the scale, if the number of metal particles is small, the effect of improving the adhesion of scale is sometimes insufficient. Therefore, at a position 10 µm distant from the boundary between base metal and scale to the scale side, the number density of metal particles consisting mainly of Ni or Cu having an average circle-equivalent diameter of 0.1 to 5 µm observed per unit area is preferably $5 \times 10^3$ pieces/mm$^2$ or higher. Also, if the number density of metal particles consisting mainly of Ni or Cu increases, that is, if the sizes of metal particles become excessively small, the ductility of scale decreases. Therefore, the number density of metal particles is preferably $5 \times 10^5$ pieces/mm$^2$ or lower.

As the number density of metal particles at the "position 10 µm distant from the boundary between base metal and scale to the scale side", around a position 10 µm distant from the boundary to the scale side, three regions each having a dimension of 20 µm in the direction perpendicular to the boundary and a dimension of 60 µm in the direction horizontal thereto are extracted randomly, and the mean value of measurement results of number densities in those regions is used. Also, the number density of metal particles is calculated as described below. The element mapping image of Ni or Cu obtained by EPMA is subjected to binarization processing of black and white, the number of particles in which Ni or Cu concentrates is counted, the particle numbers in three visual fields are arithmetically averaged, and the averaged value is divided by the measurement area (1200 µm$^2$).

2. Chemical Composition

The seamless steel pipe for line pipe according to the present invention has the chemical composition consisting, by mass percent, of C: 0.03 to 0.15%, Si: 0.50% or less, Mn: 1.0 to 2.0%, P: 0.050% or less, S: 0.005% or less, Cr: 0.1 to 1.0%, Al: 0.001 to 0.10%, N: 0.01% or less, Ni: 0.05 to 2.0%, B: 0.0003 to 0.0015%, Ca: 0.0002 to 0.0050%, Mo: 0.10 to 0.50%, Ti: 0.001 to 0.05%, Cu: 0 to 2.0%, Nb: 0 to 0.05%, V: 0 to 0.10%, the balance: Fe and impurities, and satisfying the following formula (i).

$$2Nb+4V+Mo \leq 0.50 \qquad (i)$$

where each symbol of element in formula (i) represents the content (mass %) of each element.

The term "impurities" means components that are mixed in on account of various factors in the production process including raw materials such as ore and scrap when an alloy is produced on an industrial basis, which components are allowed in the range of not exerting an adverse influence on the present invention.

The reason why the content of each element is restricted is as described below. In the following explanation, the symbol "%" for the content means "mass %".

C: 0.03 to 0.15%

C (carbon) is an element necessary for enhancing the hardenability and for increasing the strength. If the C content is less than 0.03%, the required strength cannot be assured. On the other hand, if the C content is more than 0.15%, the surface hardness is increased, and the SSC resistance is deteriorated. Also, when welding is performed, the hardening and the deterioration in toughness occur in the heat affected zone. Therefore, the C content has to be set to 0.03 to 0.15%. The C content is preferably 0.04% or more. And the C content is preferably 0.08% or less, further preferably 0.07% or less.

Si: 0.50% or less

Si (silicon) is an element having a deoxidizing function and contributing to the increase in strength. However, if more than 0.50% of Si is contained, the precipitation of cementite is suppressed, and an M-A constituent (Martensite-Austenite constituent) is liable to precipitate. Therefore, the Si content is set to 0.50% or less. The Si content is preferably 0.30% or less. The Si content is preferably 0.002% or more in order to obtain the effect of deoxidation even though for the seamless steel pipe of the present invention too low a content of Si presents no problem unless the deoxidation of steel is hindered.

Mn: 1.0 to 2.0%

Mn (manganese) is an element for enhancing the hardenability without the increase in tempering softening resistance, and also effective in assuring the strength. If the Mn content is less than 1.0%, a high strength of 550 MPa or higher cannot be assured. On the other hand, if more than 2.0% of Mn is contained, the segregation increases, and also the hardenability becomes too high, so that the toughness is deteriorated in both of the base metal and the weld heat affected zone. Therefore, the Mn content has to be set to 1.0 to 2.0%. The Mn content is preferably 1.2% or more, and preferably 1.8% or less.

P: 0.050% or less

P (phosphorus) is an element existing unavoidably in a steel as an impurity.

However, if the P content is more than 0.050%, P segregates at the grain boundaries, and may deteriorate the toughness. Therefore, the P content is set to 0.050% or less. The P content is preferably 0.020% or less, further preferably 0.013% or less.

S: 0.005% or less

S (sulfur) is an element existing unavoidably in a steel as an impurity. However, if the content of S is more than 0.005%, sulfide-based nonmetallic inclusions such as MnS are formed, and thereby the hydrogen-induced cracking resistance may be deteriorated. Therefore, the S content is set to 0.005% or less. The S content is preferably 0.002% or less, further preferably 0.0012% or less.

Cr: 0.1 to 1.0%

Cr (chromium) is an element for enhancing the hardenability and the tempering softening resistance and for increasing the strength, so that 0.1% or more of Cr has to be contained. However, if more than 1.0% of Cr is contained, the toughness is deteriorated. Therefore, the Cr content is set to 0.1 to 1.0%. The Cr content is preferably 0.15% or more, and preferably 0.6% or less.

Al: 0.001 to 0.10%

Al (aluminum) is an element having a deoxidizing function and also an element effective in preventing cracking of cast piece by means of the fixation of N in steel. If the content of Al is low, deoxidation becomes insufficient, and thereby the steel properties are deteriorated, so that 0.001% or more of Al has to be contained. However, if more than 0.10% of Al is contained, not only alumina-based nonmetallic inclusions such as $Al_2O_3$ are formed, but also the precipitation of cementite is suppressed, so that M-A constituent is liable to precipitate. Therefore, the content of Al is set to 0.001 to 0.10%. The Al content is preferably 0.01% or more, and preferably 0.05% or less.

N: 0.01% or less

N (nitrogen) exists in a steel as an impurity. If the content of N is more than 0.01%, the steel properties are deteriorated. Therefore, the content of N is set to 0.01% or less. The N content is preferably 0.007% or less, further preferably 0.005% or less.

Ni: 0.05 to 2.0%

Ni (nickel) is an element for improving the hardenability and toughness. Further, in the present invention, by containing Ni, the metal particles consisting mainly of Ni are dispersed finely in the surface scale to improve the adhesion of surface scale. Therefore, 0.05% or more of Ni has to be contained. However, if more than 2.0% of Ni is contained, the SSC resistance of the weld heat affected zone deteriorates. Therefore, the Ni content is set to 0.05 to 2.0%. The Ni content is preferably 0.10% or more, and preferably 1.8% or less. As described below in the case where Cu is contained Ni is an element effective also in preventing surface hot-shortness due to Cu during continuous casting and during hot rolling. In the case where it is desired to achieve this effect, the Ni content has to be made one third or more of the Cu content.

B: 0.0003 to 0.0015%

B (boron) is an element for enhancing the hardenability without deteriorating toughness largely, and also increasing the strength. Moreover, since tempering softening resistance of B is low as compared with those of Mn and Cr, the surface hardness does not increase remarkably despite the improvement of hardenability by containing B. If the B content is less than 0.0003%, a high strength of 550 MPa or higher cannot be assured with suppressing the surface hardness. On the other hand, if more than 0.0015% of B is contained, the toughness is deteriorated due to the precipitation of BN. Therefore, the B content has to be set to 0.0003 to 0.0015%. The B content is preferably 0.0005% or more, and preferably 0.0010% or less.

Ca: 0.0002 to 0.0050%

Ca (calcium) is used for mode control of nonmetallic inclusions such as MnS and $Al_2O_3$, and improves the toughness and hydrogen-induced cracking resistance. Therefore, 0.0002% or more of Ca has to be contained. However, if more than 0.0050% of Ca is contained, the Ca-based inclusions are liable to be clustered. Therefore, the Ca content is set to 0.0002 to 0.0050%. The Ca content is preferably 0.0010% or more, and preferably 0.0040% or less.

Mo: 0.10 to 0.50%

Mo (molybdenum) is an element for greatly enhancing the hardenability and the tempering softening resistance and for increasing the strength. Therefore, 0.100/% or more of Mo has to be contained. However, if more than 0.50% of Mo is contained, the tempering softening resistance becomes excessive, and the surface hardness after tempering does not decrease. Therefore, the content of Mo is set to 0.10 to 0.50%. The Mo content is preferably 0.15% or more, and preferably 0.40% or less.

Ti: 0.001 to 0.05%

Ti (titanium) is an element effective in preventing cracking of cast piece by means of the fixation of N in steel. Therefore, 0.001% or more of Ti has to be contained. However, if more than 0.05% of Ti is contained, the carbonitrides of Ti are coarsened, and the toughness is deteriorated. Therefore, the Ti content is set to 0.001 to 0.05%. The Ti content is preferably 0.003% or more and preferably 0.01% or less.

Cu: 0 to 2.0%

Cu (copper) is an element for improving the toughness and hardenability. Further, in the present invention, by containing Cu together with Ni, the metal particles consisting mainly of Ni or Cu are dispersed finely in the surface scale, and the adhesion of surface scale is improved. Therefore, Cu may be contained as necessary. However, if more than 2.0% of Cu is contained, the SSC resistance of the weld heat affected zone deteriorates. Therefore, the Cu content, if being contained, is set to 2.0% or less. The Cu content is preferably 1.0% or less.

The effect of improving the adhesion of scale can be achieved sufficiently even in the case where Ni is contained singly, so that Cu needs not necessarily be contained positively. However, since Ni is an expensive element, it is desirable to replace a part thereof with Cu. Also, a steel usually contains Cu as an impurity element, so that it is unfavorable in terms of economy to decrease the Cu content excessively. Therefore, the Cu content is preferably 0.01% or more, and more preferably 0.02%, further preferably 0.05% or more.

Nb: 0 to 0.05%

Nb (niobium) is an element for greatly enhancing the hardenability and tempering softening resistance and for increasing the strength, so that Nb may be contained as necessary. However, if more than 0.05% of Nb is contained, the tempering softening resistance becomes excessive, and the surface hardness after tempering does not decrease. Therefore, the Nb content, if being contained, is set to 0.05% or less. The Nb content is preferably 0.04% or less. In the case where it is desired to achieve the above-described effects, the Nb content is preferably 0.01% or more, further preferably 0.02% or more.

V: 0 to 0.10%

V (vanadium) is an element for greatly enhancing the hardenability and tempering softening resistance and for increasing the strength, so that V may be contained as necessary. However, if more than 0.10% of V is contained, the tempering softening resistance becomes excessive, and the surface hardness after tempering does not decrease. Therefore, the V content, if being contained, is set to 0.10% or less. The V content is preferably 0.07% or less. In the case where it is desired to achieve the above-described effects, the V content is preferably 0.01% or more, further preferably 0.02% or more.

$$2Nb+4V+Mo \leq 0.50 \quad (i)$$

where each symbol of element in formula (i) represents the content (mass %) of each element.

As described above, Nb, V and Mo are elements for enhancing the hardenability and for increasing the strength. However, if Nb, V and Mo are contained excessively, the hardness does not decrease even after tempering, since these elements remarkably increase the tempering softening resistance. Therefore, the contents of Nb, V and Mo have to be restricted so as to satisfy the above-mentioned formula (i). The value of $2Nb+4V+Mo$ is preferably 0.48 or less, and 0.14 or more in order to assure hardenability.

3. Metal Micro-Structure

Since the seamless steel pipe for line pipe according to the present invention is of a low-carbon steel, by the ordinary quenching and tempering treatment, martensite is not formed, and a micro-structure consists mainly of bainite. As described before, for the micro-structure consisting mainly of bainite, the hardness greatly depends on the cooling rate. Therefore, in a location where the scale on the steel pipe surface is detached, the cooling rate is high and therefore the hardness is high, whereas in a location where the scale adheres firmly to the steel pipe surface, the cooling rate is low and therefore the hardness is low.

In the present invention, since the scale can be caused to adhere evenly, the highest hardness on the steel pipe surface can be restrained. That is to say, the effect of the present invention is exerted remarkably for the steel pipe having the metal micro-structure consisting mainly of bainite. Therefore, the seamless steel pipe for line pipe of the present invention has a metal micro-structure containing 50% or more of bainite in area fraction. The area fraction of bainite in the metal micro-structure is preferably 70% or more, further preferably 85% or more. In the present invention, bainite includes an M-A constituent which is specific for bainite structure.

4. Wall Thickness of Steel Pipe

As the wall thickness of steel pipe increases, a difference in cooling rate between the surface and the interior of steel pipe occurs, and resultantly, the highest hardness on the surface becomes high with respect to the strength of steel. In the present invention, however, a thick scale can be attached closely to the steel pipe surface evenly. Therefore, due to the thermal insulation effect brought about by the thick scale, the cooling rate of the steel pipe surface portion is reduced, and the increase in surface hardness can be suppressed. That is to say, the effect of the present invention is exerted remarkably for the steel pipe having a large wall thickness. Therefore, the seamless steel pipe for line pipe of the present invention has a wall thickness of 25 mm or larger. The wall thickness of steel pipe is preferably 30 mm or larger.

5. Production Method

The production method for the seamless steel pipe for line pipe according to the present invention is not subject to any special restriction. However, for example, by using the method described below, a seamless steel pipe having a yield strength of 550 MPa or higher and a toughness at the fracture transition temperature (vTrs) of −80° C. or lower, and also having the highest hardness on the steel pipe surface of 250 HV10 or lower can be produced.

<Melting and Casting>

Concerning the melting and casting, the method carried out in the production method for general seamless steel pipes can be used, and the casting may be ingot casting or continuous casting.

<Hot Working>

After the casting, hot working such as forging, piercing, or rolling is performed to produce a seamless steel pipe. Concerning the conditions in hot working, general conditions used in the production method for seamless steel pipes have only to be applied. For example, a billet produced by continuous casting is heated to a temperature of 1200° C. or higher, and a hollow blank is obtained by using a skew roll piercing machine. This hollow blank is finish rolled into a steel pipe by using a mandrel mill and a sizing mill. The pipe-making finishing temperature is preferably set at a temperature of 950° C. or higher.

<Quenching>

The steel pipe may be reheated and quenched after being allowed to cool after having been hot-worked, and may be conveyed into the furnace without being allowed to cool before the surface temperature of steel pipe becomes a temperature lower than the $Ar_3$ transformation point, be heated, and be quenched. The heating temperature during quenching is not subject to any special restriction; however, the heating temperature is preferably set at a temperature of $Ac_3+50°$ C. or higher. Also, the heating time is not subject to any special restriction; however, the soaking time is preferably set to 5 min or longer.

In the present invention, in order to disperse the metal particles consisting mainly of Ni or Cu in a wide range and to accelerate the growth rate of the scale having a high adhesion, the atmosphere in the furnace is preferably made an oxidizing environment, and specifically, the water vapor concentration is preferably made 5% or higher. In order to accelerate the growth rate of scale stably, the water vapor concentration is further preferably made 10% or higher. The upper limit of the water vapor concentration is not subject to any special restriction. However, the upper limit thereof is preferably made 25% or lower because if the water vapor concentration is excessively high, the service life of furnace wall is shortened.

Concerning the cooling rate during quenching, if the cooling rate at the central portion of wall thickness is lower than 10° C./s, a sufficient strength cannot be attained, so that accelerated cooling is preferably performed at a cooling rate of 10° C./s or higher. Also, concerning the cooling method, the cooling method is not subject to any special restriction as far as accelerated cooling can be performed; however, water cooling is preferably performed.

<Tempering>

After quenching, tempering is preferably performed. The tempering temperature is not subject to any special restriction. However, the tempering temperature is preferably set at a temperature of $Ac_1-50°$ C. or lower because if tempering is performed at a temperature of higher than $Ac_1-50°$ C., the strength is decreased remarkably, and a yield strength of 550 MPa or higher cannot be assured in some cases.

Hereunder, the present invention is explained more specifically with reference to Examples; however, the present invention is not limited to these Examples.

EXAMPLE 1

Steels having the chemical compositions given in Table 1 were melted in a vacuum furnace, and a 180-kg ingot was produced for each of the steels. The produced ingot was charged into a heating furnace, and was soaked at 1250° C. for 1 h. The ingot taken out of the heating furnace was hot-forged into a rectangular prismatic block. The block was charged into the heating furnace, and was soaked at 1250° C. for 30 min. The soaked block was hot-rolled, and a steel sheet having the thickness given in Table 2 was produced.

to tempering treatment in which the steel sheet was held at 650° C. for 30 min.

In a location near the boundary between base metal and scale of the obtained steel sheet, a backscattered electron image and an element mapping image obtained by EPMA were acquired, and on the basis of these images, the distribution of metal particles consisting mainly of Ni or Cu was examined.

EPMA measurement was performed by using JXA-8530F (made by JEOL Ltd.) at 2000-fold magnification. A beam diameter was 1 pun, a measuring pitch was 0.12 μm in X direction and 0.12 μm in Y direction, and an accelerating voltage was 15 kV. In the above condition, the intensities of the characteristic X-rays of Cu and Ni were measured and the element mapping image obtained by the measurement was subjected to binarization processing of black and white,

TABLE 1

Chemical composition (in mass %, balance: Fe and impurities)

| Steel | C | Si | Mn | P | S | Cr | Al | N | Ni | B | Ca | Mo | Ti | Cu | Nb | V | Left side value of (i) † |
|---|---|---|---|---|---|---|---|---|---|---|---|---|---|---|---|---|---|
| A | 0.05 | 0.14 | 1.52 | 0.013 | 0.0012 | 0.26 | 0.030 | 0.0048 | 0.40 | 0.0006 | 0.0019 | 0.36 | 0.001 | 0.25 | — | 0.020 | 0.44 |
| B | 0.05 | 0.14 | 1.53 | 0.012 | 0.0010 | 0.26 | 0.029 | 0.0047 | 0.41 | 0.0006 | 0.0019 | 0.36 | 0.006 | 0.25 | — | 0.020 | 0.44 |
| C | 0.05 | 0.14 | 1.54 | 0.013 | 0.0012 | 0.26 | 0.030 | 0.0041 | 0.40 | 0.0006 | 0.0023 | 0.36 | 0.010 | 0.25 | — | 0.019 | 0.44 |
| D | 0.06 | 0.12 | 1.51 | 0.010 | 0.0008 | 0.31 | 0.028 | 0.0054 | 0.15 | 0.0010 | 0.0024 | 0.27 | 0.008 | 0.15 | — | 0.050 | 0.47 |
| E | 0.06 | 0.12 | 1.53 | 0.011 | 0.0011 | 0.27 | 0.028 | 0.0045 | 0.35 | 0.0008 | 0.0024 | 0.35 | 0.003 | 0.25 | 0.023 | — | 0.40 |
| F | 0.04 | 0.15 | 1.40 | 0.008 | 0.0010 | 0.20 | 0.028 | 0.0042 | 0.80 | 0.0006 | 0.0022 | 0.20 | 0.008 | 0.80 | 0.010 | — | 0.22 |
| G | 0.04 | 0.16 | 1.41 | 0.008 | 0.0010 | 0.20 | 0.028 | 0.0040 | 1.70 | 0.0006 | 0.0021 | 0.20 | 0.008 | 0.80 | 0.010 | — | 0.22 |
| H | 0.07 | 0.13 | 1.51 | 0.014 | 0.0010 | 0.45 | 0.032 | 0.0047 | 0.25 | — * | 0.0012 | 0.50 | 0.005 | 0.25 | — | 0.020 | 0.58 * |
| I | 0.05 | 0.14 | 1.40 | 0.014 | 0.0008 | 0.46 | 0.033 | 0.0054 | 0.25 | — * | 0.0013 | 0.71 * | 0.005 | 0.25 | — | 0.019 | 0.79 * |
| J | 0.06 | 0.14 | 1.55 | 0.010 | 0.0008 | 0.35 | 0.030 | 0.0054 | — * | 0.0010 | 0.0024 | 0.25 | 0.006 | — | — | 0.050 | 0.45 |
| K | 0.06 | 0.11 | 1.47 | 0.010 | 0.0010 | 0.31 | 0.028 | 0.0042 | 0.30 | — * | 0.0037 | 0.25 | 0.003 | 0.20 | — | 0.040 | 0.41 |
| L | 0.06 | 0.12 | 1.51 | 0.010 | 0.0008 | 0.31 | 0.028 | 0.0054 | 0.15 | 0.0010 | 0.0024 | 0.27 | 0.008 | 0.15 | — | 0.060 | 0.51 * |

* indicates that conditions do not satisfy those defined by the present invention.
† $2Nb + 4V + Mo \leq 0.50$ ... (i)

TABLE 2

| Test No. | Steel | Area fraction of bainite (%) | Wall thickness (mm) | water vapor concentration (%) | $Ac_1$ (° C.) | $Ac_3$ (° C.) | $Ar_3$ (° C.) | Yield strength (MPa) | Toughness vTrs (° C.) | Highest hardness (Hv10) | Distance from a boundary between base metal and scale to a region where metal particles do not exist (μm) | Average diameter of metal particle (μm) | Number density (pieces/mm²) | |
|---|---|---|---|---|---|---|---|---|---|---|---|---|---|---|
| 1 | A | 92 | 25 | 20 | 733 | 892 | 751 | 555 | −86 | 229 | 25 | 1.2 | $2.4 \times 10^4$ | Inventive |
| 2 | B | 98 | 25 | 20 | 732 | 892 | 750 | 582 | −98 | 240 | 26 | 1.1 | $2.5 \times 10^4$ | example |
| 3 | C | 98 | 25 | 20 | 734 | 894 | 749 | 598 | −114 | 241 | 24 | 1.0 | $2.1 \times 10^4$ | |
| 4 | D | 93 | 25 | 20 | 736 | 897 | 762 | 610 | −80 | 239 | 22 | 1.3 | $2.2 \times 10^4$ | |
| 5 | E | 96 | 25 | 20 | 739 | 885 | 729 | 605 | −82 | 242 | 30 | 1.2 | $1.9 \times 10^4$ | |
| 6 | F | 95 | 30 | 18 | 711 | 873 | 695 | 598 | −80 | 235 | 29 | 1.2 | $1.9 \times 10^4$ | |
| 7 | G | 97 | 30 | 18 | 692 | 850 | 660 | 622 | −88 | 240 | 30 | 1.3 | $2.0 \times 10^4$ | |
| 8 | B | 98 | 25 | 3 | 732 | 892 | 750 | 599 | −82 | 253 | 10 * | 1.0 | $2.1 \times 10^4$ | Comparative |
| 9 | C | 98 | 25 | 2 | 734 | 894 | 750 | 618 | −90 | 255 | 11 * | 1.3 | $2.0 \times 10^4$ | example |
| 10 | D | 95 | 25 | 2 | 736 | 897 | 765 | 622 | −70 | 256 | 10 * | 0.9 | $1.8 \times 10^4$ | |
| 11 | H * | 87 | 40 | 1 | 744 | 890 | 740 | 606 | −50 | 258 | 8 * | 0.8 | $1.5 \times 10^4$ | |
| 12 | I * | 85 | 40 | 2 | 750 | 909 | 746 | 587 | −67 | 265 | 9 * | 1.0 | $1.7 \times 10^4$ | |
| 13 | J * | 86 | 25 | 20 | 745 | 903 | 779 | 590 | −75 | 255 | Not exist * | — | — | |
| 14 | K * | 68 | 40 | 20 | 734 | 887 | 755 | 490 | −102 | 230 | 30 | 1.1 | $1.8 \times 10^4$ | |
| 15 | L * | 89 | 25 | 20 | 738 | 899 | 765 | 635 | −70 | 251 | 20 | 1.2 | $2.0 \times 10^4$ | |

* indicates that conditions do not satisfy those defined by the present invention.

The finishing temperature at the hot rolling was 1050° C. After the produced steel sheet had been allowed to cool, the steel sheet is reheated, held at 950° C. for 10 min, and being subjected to water quenching treatment (accelerated cooling) in an atmosphere having a water vapor concentration indicated in Table 2. Thereafter, the steel sheet was subjected where the portion in which the measured value was 100 or more was indicated by white representing a metal particle consisting mainly of Ni or Cu, and the other portions were indicated by black representing scale. And, the number density of metal particles is calculated by counting the number of particles indicated by white, averaging the particle numbers in three visual fields arithmetically and dividing the averaged value by the measurement area (1200 μm$^2$).

The distance from the boundary between base metal and scale to the region in which the metal particles do not exist and the number density of metal particles observed per unit area at the position 10 μm distant from the boundary to the scale side were measured. The results of these measurements are also given in Table 2.

Also, a test specimen was cut out of the steel sheet. By using this test specimen, the metal micro-structure was observed, and the yield strength, toughness and surface hardness were measured. The observation of metal micro-structure was made by the procedure described below. First, the metal micro-structure was made to appear with nital etching reagent in the central portion of the wall thickness of steel sheet. Subsequently, optical micro-structure photographs of 500 μm square were taken in three views of the central portion of the wall thickness of steel sheet. On each of the micro-structure photographs, straight lines were drawn in the longitudinal direction and the transverse direction at a pitch of 25 μm, and the number of lattice points on the ferrite structure was counted. Then, the number of lattice points on the ferrite structure was subtracted from the number of all lattice points, and the ratio was determined in percentage. The obtained ratio was made the area fraction of bainite on each micro-structure photograph. The average bainite area fraction was determined by arithmetically averaging the bainite area fractions obtained by each of the micro-structure photographs.

The yield strength was measured by the procedure described below. From the central portion of wall thickness of each steel sheet, a No. 14A tension test specimen (a round bar test specimen having a diameter of 8.5 mm) specified in JIS Z 2241 (2011) was sampled. By using the sampled test specimen, a tension test in conformity to JIS Z 2241 (2011) was conducted in the atmosphere at normal temperature (25° C.), and the yield strength (0.2% yield stress) was determined.

Additionally, from the central portion of wall thickness (the central portion of sheet thickness) of each steel sheet, a V-notch test specimen specified in JIS Z 2242 (2005) was sampled so as to be in parallel to a cross sectional direction of the steel sheet. Each of the V-notch test specimens had a center in the sheet thickness located at the center of a cross section (10 mm×10 mm) and had a V notch with a depth of 2 mm. A Charpy impact tests in accordance with JIS Z 2242 (2005) were performed by the use of the sampled V-notch test specimens at various temperatures and the temperature where the brittle fracture rate comes to 50% (the fracture transition temperature (vTrs)) was calculated.

Furthermore, on the cross section of the test specimen, in six locations at a position 1 mm deep from the surface, Vickers hardness test was conducted with the test force of 98.07N (10 kgf). The area fraction of bainite, the yield strength, the toughness and the highest hardness at a position 1 mm deep from the surface are also given in Table 2.

As can be seen from Table 2, in test Nos. 8 to 10, which was a comparative example, although the chemical composition satisfies the definition of the present invention, since the water vapor concentration in the quenching furnace was low, the metal particles consisting mainly of Ni or Cu existed merely to a position 11 μm or less distant from the boundary between base metal and scale. Thus, the adhesion of scale was low, the highest hardness was higher than 250 HV10, and the result was that the SSC resistance was poor.

Also, in test Nos. 11 and 12, since the B content and the left side value of the formula (i) did not satisfy the definition of the present invention, the result was that the toughness was poor. In addition, since the atmosphere in the soaking pit was not proper, the metal particles existed merely to a position 9 μm or less distant from the boundary between base metal and scale. Thus, the adhesion of scale was low, the highest hardness was higher than 250 HV10, and the result was that the SSC resistance was poor.

In test No. 13, by the absence of the contents of Ni and Cu the metal particles consisting mainly of Ni or Cu did not exist in the scale despite the appropriate water vapor concentration in the quenching furnace. Thus, the adhesion of scale was low, the highest hardness was higher than 250 HV10, and the result was that the SSC resistance was poor.

In test No. 14, since the B content did not satisfy the definition of the present invention, the yield strength was as low as 490 MPa and the result was that the strength was poor. Further, in test No. 15, since the left side value of the formula (i) did not satisfy the definition of the present invention, the highest hardness was higher than 250 HV10, and the result was that the SSC resistance was poor.

On the other hand, in test Nos. 1 to 7, which were inventive examples, the yield strength was 555 MPa or higher and vTrs was −80° C. or lower, and therefore the steel sheets had excellent strengths and toughness. Also, the metal particles consisting mainly of Ni or Cu having an average circle-equivalent diameter of 1.0 μm or larger existed to a position 22 μm or larger distant from the boundary between base metal and scale, and the number density was 1.9×10$^4$ pieces/mm$^2$ or higher, so that the adhesion of scale was good. Therefore, it can be seen that the highest hardness at the position 1 mm deep from the surface was as low as 241 HV10 or lower, and therefore the SSC resistance was excellent.

INDUSTRIAL APPLICABILITY

According to the present invention, the steel pipe has a yield strength of 550 MPa or higher and a toughness at the fracture transition temperature (vTrs) of −80° C. or lower, and also the highest hardness on the surface of steel pipe can be restrained to 250 HV100 or lower, so that a high-strength and high-toughness seamless steel pipe excellent in SSC resistance can be obtained. Therefore, the seamless steel pipe in accordance with the present invention can be used suitably as a line pipe for transmitting crude oil and natural gas containing large amounts of H$_2$S.

What is claimed is:
1. A seamless steel pipe for line pipe having a chemical composition consisting, by mass percent, of
  C: 0.03 to 0.15%,
  Si: 0.50% or less,
  Mn: 1.0 to 2.0%,
  P: 0.050% or less,
  S: 0.005% or less,
  Cr: 0.1 to 1.0%,
  Al: 0.001 to 0.10%,
  N: 0.01% or less,
  Ni: 0.05 to 2.0%,
  B: 0.0003 to 0.0015%,
  Ca: 0.0002 to 0.0050%,
  Mo: 0.10 to 0.50%,
  Ti: 0.001 to 0.05%,
  Cu: 0 to 2.0%,
  Nb: 0 to 0.05%,
  V: 0 to 0.10%,
  the balance: Fe and impurities, and
  satisfying the following formula (i), wherein a metal micro-structure of the steel pipe contains 50% or more of bainite, in an area fraction;
a wall thickness of the steel pipe is 25 mm or larger; and
in a scale formed on the surface of the steel pipe, metal particles consisting mainly of Ni or Cu having an average circle-equivalent diameter of 0.1 to 5 μm exist, and a distance from a boundary between the base metal of the steel pipe and the scale to a region in which the metal particles do not exist is 20 μm or longer:

$$2Nb+4V+Mo \leq 0.50 \quad \text{(i)}$$

where each symbol of element in formula (i) represents the content (mass %) of each element.

2. The seamless steel pipe for line pipe according to claim 1, wherein
the chemical composition contains, by mass percent,
one or more elements selected from
Cu: 0.01 to 2.0%,
Nb: 0.01 to 0.05%, and
V: 0.01 to 0.10%.

3. The seamless steel pipe for line pipe according to claim 2, wherein at a position 10 μm distant from the boundary to the scale side, the number density of the metal particles observed per unit area is $5 \times 10^3$ pieces/mm$^2$ or higher.

4. The seamless steel pipe for line pipe according to claim 1, wherein at a position 10 μm distant from the boundary to the scale side, the number density of the metal particles observed per unit area is $5 \times 10^3$ pieces/mm$^2$ or higher.

5. A method for producing the seamless steel pipe for line pipe according to claim 4, wherein the steel pipe having the chemical composition consisting, by mass percent, of
C: 0.03 to 0.15%,
Si: 0.50% or less,
Mn: 1.0 to 2.0%,
P: 0.050% or less,
S: 0.005% or less,
Cr: 0.1 to 1.0%,
Al: 0.001 to 0.10%,
N: 0.01% or less,
Ni: 0.05 to 2.0%,
B: 0.0003 to 0.0015%,
Ca: 0.0002 to 0.0050%,
Mo: 0.10 to 0.50%,
Ti: 0.001 to 0.05%,
Cu: 0 to 2.0%,
Nb: 0 to 0.05%,
V: 0 to 0.10%,
the balance: Fe and impurities, and
satisfying the following formula (i),
is conveyed into a furnace after the finish of hot rolling, being heated in an atmosphere with the temperature of Ac$_3$+50° C. or higher and the water vapor concentration of 5% or higher, and thereafter is subjected to quenching treatment in which accelerated cooling is performed at a rate of 10° C./s or higher, subsequently being tempered at a temperature of Ac$_1$−50° C. or lower:

$$2Nb+4V+Mo \leq 0.50 \quad \text{(i)}$$

where each symbol of element in formula (i) represents the content (mass %) of each element.

6. The method for producing the seamless steel pipe for line pipe according to claim 5, wherein
the chemical composition contains, by mass percent,
one or more elements selected from
Cu: 0.01 to 2.0%,
Nb: 0.01 to 0.05%, and
V: 0.01 to 0.10%.

7. A method for producing the seamless steel pipe for line pipe according to claim 1, wherein the steel pipe having the chemical composition consisting, by mass percent, of
C: 0.03 to 0.15%,
Si: 0.50% or less,
Mn: 1.0 to 2.0%,
P: 0.050% or less,
S: 0.005% or less,
Cr: 0.1 to 1.0%,
Al: 0.001 to 0.10%,
N: 0.01% or less,
Ni: 0.05 to 2.0%,
B: 0.0003 to 0.0015%,
Ca: 0.0002 to 0.0050%,
Mo: 0.10 to 0.50%,
Ti: 0.001 to 0.05%,
Cu: 0 to 2.0%,
Nb: 0 to 0.05%,
V: 0 to 0.10%,
the balance: Fe and impurities, and
satisfying the following formula (i),
is conveyed into a furnace after the finish of hot rolling, being heated in an atmosphere with the temperature of Ac$_3$+50° C. or higher and the water vapor concentration of 5% or higher, and thereafter is subjected to quenching treatment in which accelerated cooling is performed at a rate of 10° C./s or higher, subsequently being tempered at a temperature of Ac$_1$−50° C. or lower:

$$2Nb+4V+Mo \leq 0.50 \quad \text{(i)}$$

where each symbol of element in formula (i) represents the content (mass %) of each element.

8. The method for producing the seamless steel pipe for line pipe according to claim 7, wherein
the chemical composition contains, by mass percent,
one or more elements selected from
Cu: 0.01 to 2.0%,
Nb: 0.01 to 0.05%, and
V: 0.01 to 0.10%.

* * * * *